US012585881B2

(12) United States Patent
Tsunoda

(10) Patent No.: US 12,585,881 B2
(45) Date of Patent: Mar. 24, 2026

(54) NATURAL LANGUAGE PROCESSING SYSTEM, NATURAL LANGUAGE PROCESSING METHOD, AND NATURAL LANGUAGE PROCESSING PROGRAM

(71) Applicant: Nomura Research Institute, Ltd., Tokyo (JP)

(72) Inventor: Mitsuhiro Tsunoda, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 280 days.

(21) Appl. No.: 18/460,762

(22) Filed: Sep. 5, 2023

(65) Prior Publication Data

US 2024/0135107 A1 Apr. 25, 2024
US 2024/0232537 A9 Jul. 11, 2024

(30) Foreign Application Priority Data

Oct. 25, 2022 (JP) ................................. 2022-170607

(51) Int. Cl.
  *G06F 17/00* (2019.01)
  *G06F 40/289* (2020.01)
  *G06F 40/30* (2020.01)
(52) U.S. Cl.
  CPC ............ *G06F 40/30* (2020.01); *G06F 40/289* (2020.01)
(58) Field of Classification Search
  None
  See application file for complete search history.

(56) References Cited

U.S. PATENT DOCUMENTS

| | | | | |
|---|---|---|---|---|
| 10,789,461 | B1 * | 9/2020 | Agrawal | G06F 40/295 |
| 11,270,185 | B1 * | 3/2022 | Ouyang | G06N 3/004 |
| 11,379,687 | B2 * | 7/2022 | He | H04L 67/02 |
| 2017/0262435 | A1 * | 9/2017 | Sonoo | G06F 40/56 |
| 2019/0132274 | A1 * | 5/2019 | Seshiah | G06Q 10/107 |
| 2019/0213190 | A1 * | 7/2019 | Ito | G06F 16/00 |
| 2022/0156490 | A1 * | 5/2022 | Matiukhov | G06F 18/40 |
| 2024/0193370 | A1 * | 6/2024 | Achiwa | G06F 40/295 |

FOREIGN PATENT DOCUMENTS

JP 2007-52615 A 3/2007

* cited by examiner

*Primary Examiner* — Satwant K Singh
(74) *Attorney, Agent, or Firm* — RANKIN, HILL & CLARK LLP

(57) ABSTRACT

A natural language processing system including: a weight array acquisition unit that acquires a weight array related to a weight for determining a label corresponding to a character string, the weight array being generated by learning based on at least one learning character string in which a feature and a label of at least one character string including at least one character are set; a feature extraction unit that extracts a feature corresponding to a target character string; and a label determination unit that determines the label of the target character string on the basis of the learned model generated by learning, the weight array, and the extracted at least one feature.

4 Claims, 8 Drawing Sheets

FIG. 2

LEARNING CHARACTER STRING INFORMATION

| LEARNING CHARACTER STRING ID | LEARNING CHARACTER STRING CONTENT INFORMATION | FEATURE INFORMATION | LABEL INFORMATION |
|---|---|---|---|
| TrS0001 | ... | ... | ... |
| | 4 | CHARACTER TYPE: NUMBER MORPHEME: NOUN/NUMBER/BEGINNING | B-DAT |
| | GATSU (MONTH) | CHARACTER TYPE: KANJI CHARACTER MORPHEME: NOUN/GENERAL/MIDDLE | I-DAT |
| | 16 | ... | ... |
| | NICHI (DAY) | ... | ... |
| | ... | ... | ... |
| | ... | ... | ... |
| ... | | | |

FIG. 3

WEIGHT ARRAY

| FEATURE INFORMATION | RELATIVE POSITION INFORMATION | WEIGHT INFORMATION |
|---|---|---|
| CHARACTER TYPE: NUMBER MORPHEME: NOUN/NUMBER/BEGINNING | −3 | ******** |
| . . . | . . . | . . . |

FIG. 4

TARGET CHARACTER STRING INFORMATION

| TARGET CHARACTER STRING ID | GROUP ID | TARGET CHARACTER STRING CONTENT INFORMATION |
|---|---|---|
| S0001 | G0001 | KYOU (TODAY) |
| S0002 | G0001 | TOUKYOU SHOUKEN TORIHIKIJYO (TOKYO STOCK EXCHANGE) |
| S0003 | G0001 | DEWA (IN) |
| . . . | . . . | . . . |

FIG. 5

| CLAUSE CONTENT | KABUSHIKISHIJOWA, (THE STOCK MARKET) | GESSHOWA (EARLY IN THE MONTH) | GERAKUSHITE (FALLING) | HAJIMARIMASHITA. (STARTED OFF) |
|---|---|---|---|---|
| CLAUSE NUMBER | 1 | 2 | 3 | 4 |
| MODIFICATION DESTINATION CLAUSE NUMBER | 4 | 4 | 4 | – |
| MODIFICATION SOURCE CLAUSE NUMBER | – | – | – | 1, 2, 3 |
| MODIFICATION SOURCE CLAUSE NUMBER OF MODIFICATION DESTINATION CLAUSE | 1, 2, 3 | 1, 2, 3 | 1, 2, 3 | – |

FIG. 6

| RELATIVE POSITION | WORD | FEATURE | LABEL |
|---|---|---|---|
| TWO WORDS BEFORE | WA (IS) | ... | – |
| ONE WORD BEFORE | 4 | CHARACTER TYPE: NUMBER MORPHEME: NOUN/NUMBER/BEGINNING | – |
| TARGET CHARACTER STRING | GATSU (MONTH) | CHARACTER TYPE: KANJI CHARACTER MORPHEME: NOUN/GENERAL/MIDDLE | I–DAT |
| ONE WORD AFTER | 16 | ... | – |
| TWO WORDS AFTER | NICHI (DAY) | ... | – |

FIG. 7

DETERMINATION RESULT INFORMATION

| DETERMINATION RESULT ID | TARGET CHARACTER STRING ID | DETERMINATION LABEL INFORMATION |
|---|---|---|
| R0001 | S0001 | B−DAT |
| R0002 | S0002 | B−ART |
| R0003 | S0003 | O |
| . . . | . . . | . . . |

FIG. 8

| | PATTERN 1 | PATTERN 2 |
|---|---|---|
| NUMBER OF TEACHER DATA ITEMS | 58 ITEMS | 58 ITEMS |
| ACCURACY | 64% | 82% |

NATURAL LANGUAGE PROCESSING SYSTEM, NATURAL LANGUAGE PROCESSING METHOD, AND NATURAL LANGUAGE PROCESSING PROGRAM

BACKGROUND OF THE INVENTION

1. Technical Field

The present invention relates to a natural language processing system, a natural language processing method, and a natural language processing program.

2. Description of the Related Art

In recent years, technologies related to natural language processing such as context analysis and semantic analysis of sentences by computers have been developed.

In natural language processing by a computer, processing of determining a label indicating an attribute such as a part of speech of each word included in a sentence is performed, and the sentence is analyzed in some cases.

For example, in a device described in JP 2007-52615 A, layout analysis is performed on input document image data to identify the layout of a document represented by the document image data. In addition, character analysis is performed on the input document image data, and the attribute of each described item of the document represented by the document image data is determined. Then, a hierarchical structure among the described items is identified on the basis of the identified layout and the determined attribute of each described item, and rule data representing the hierarchical structure is generated.

SUMMARY OF THE INVENTION

However, in the device described in JP 2007-52615 A, since a hierarchical structure of attributes of described items of a document is determined on the basis of the layout of the document, processing related to documents having different layouts has not been considered.

Therefore, an object of the present invention is to provide a natural language processing system, a natural language processing method, and a natural language processing program capable of analyzing documents in different layouts.

A natural language processing system according to one aspect of the present invention includes: a weight array acquisition unit that acquires a weight array related to a weight for determining a label corresponding to a character string, the weight array being generated by learning based on at least one learning character string in which a feature and a label of at least one character string including at least one character are set; a feature extraction unit that extracts a feature corresponding to a target character string; and a label determination unit that determines the label of the target character string on the basis of the learned model generated by the learning, the weight array, and the extracted at least one feature.

A natural language processing method according to one aspect of the present invention includes the steps of, a computer acquiring a weight array related to a weight for determining a label corresponding to a character string, the weight array being generated by learning based on at least one learning character string in which a feature and a label of at least one character string including at least one character are set, extracting a feature corresponding to a target character string, and determining the label of the target character string on the basis of the learned model generated by the learning, the weight array, and the extracted at least one feature.

A natural language processing program according to one aspect of the present invention causes a computer to implement: a weight array acquisition unit that acquires a weight array related to a weight for determining a label corresponding to a character string, the weight array being generated by learning based on at least one learning character string in which a feature and a label of at least one character string including at least one character are set; a feature extraction unit that extracts a feature corresponding to a target character string; and a label determination unit that determines the label of the target character string on the basis of the learned model generated by the learning, the weight array, and the extracted at least one feature.

Note that in the present invention, a "unit" does not simply mean a physical unit, and comprehends a case where a function of the "unit" is implemented by software. Functions of one "unit" or device may be implemented by two or more physical units, devices, or software, or functions of two or more "units" or devices may be implemented by one physical unit, device, or software.

According to the present invention, it is possible to provide a natural language processing system, a natural language processing method, and a natural language processing program capable of analyzing documents in different layouts.

BRIEF DESCRIPTION OF THE DRAWINGS

FIG. 2 is a diagram illustrating an example of learning character string information stored in a storage unit;

FIG. 3 is a diagram illustrating an example of a weight array stored in a storage unit;

FIG. 4 is a diagram illustrating an example of target character string information stored in a storage unit;

FIG. 5 is a diagram illustrating an example of a modification relationship in a character string;

FIG. 6 is a diagram illustrating an example of label determination processing by a label determination unit;

FIG. 7 is a diagram illustrating an example of determination result information stored in the storage unit;

FIG. 8 is a diagram illustrating an experimental result related to label determination accuracy in the natural language processing system;

DETAILED DESCRIPTION

Figure 1:
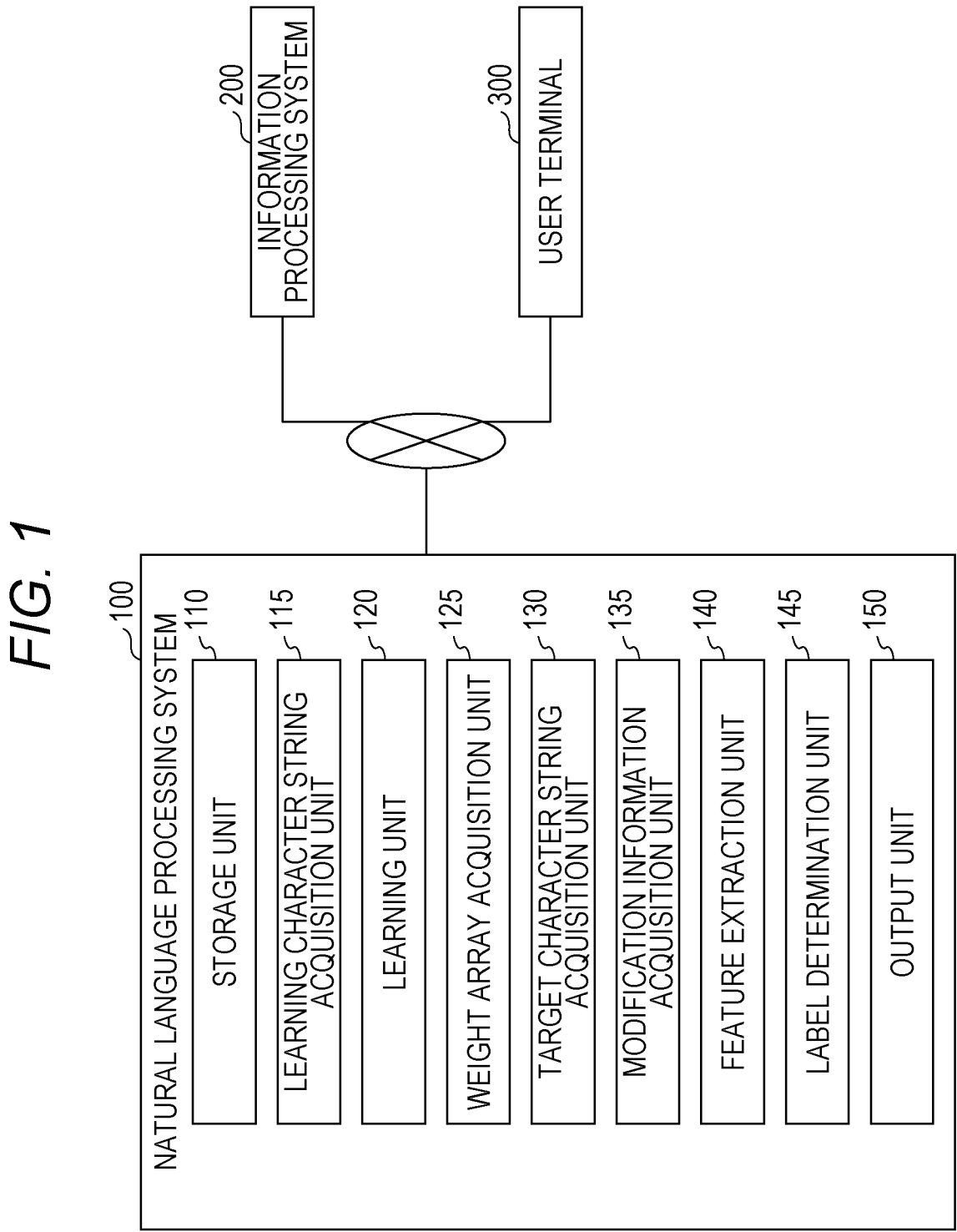
FIG. 1 is a diagram illustrating a configuration of a natural language processing system according to an embodiment of the present invention.

A preferred embodiment of the present invention will be described with reference to the accompanying drawings. FIG. 1 is a diagram illustrating a configuration of a natural language processing system 100 according to an embodiment of the present invention.

The natural language processing system 100 is an information processing system that determines a label of a target character string on the basis of a learned model generated by learning, a weight array for determining a label corresponding to a character string, and at least one feature corresponding to the target character string.

In the present embodiment, a character string is a character string including at least one character, and includes a character string including one character (i.e., one character).

The natural language processing system 100 is communicably connected to an information processing system 200 and a user terminal 300 via a network such as the Internet. Details of the natural language processing system 100 will be described later.

The information processing system 200 is an information processing system that stores a learning character string and provides the learning character string to an external information processing system (e.g., natural language processing system 100). For example, the information processing system 200 can provide the natural language processing system 100 with learning character string information related to a learning character string and information related to a feature and a label corresponding to at least one character string of the learning character string.

The user terminal 300 is a computer used by a user, and is a smartphone, a tablet terminal, a personal computer, or the like. The user terminal 300 can provide the natural language processing system 100 with document data or image data including data related to a target character string to be subjected to label determination processing by the natural language processing system 100, and can instruct the natural language processing system 100 to acquire the document data or image data from an external information processing system.

Note that, in FIG. 1, only one information processing system 200 and one user terminal 300 are illustrated as examples of the information processing system 200 and the user terminal 300, respectively, but the number of the information processing system 200 and the number of the user terminals 300 are not limited thereto.

The information processing system 200 may be a system incorporated in the natural language processing system 100.

Subsequently, details of the natural language processing system 100 will be described. The natural language processing system 100 includes a storage unit 110, a learning character string acquisition unit 115, a learning unit 120, a weight array acquisition unit 125, a target character string acquisition unit 130, a modification information acquisition unit 135, a feature extraction unit 140, a label determination unit 145, and an output unit 150. Each unit illustrated in FIG. 1 can be implemented, for example, by using a storage area or causing a processor to execute a program stored in the storage area.

The storage unit 110 stores information to be processed in the natural language processing system 100. The storage unit 110 can store, for example, learning character string information, a weight array, target character string information, modification information, and determination result information to be described later.

The learning character string acquisition unit 115 acquires learning character string information related to a learning character string in which a feature and a label are set in at least one character string, and stores the learning character string information in the storage unit 110.

Here, learning character string information is information related to a character string in which a feature and a label are set in at least one character string, and is so-called teacher data in machine learning. Furthermore, learning character string information is information learned when the natural language processing system 100 generates a weight array to be described later.

Learning character string information related to a learning character string in which a feature and a label are set in at least one character string may be information generated by the natural language processing system 100 or the information processing system 200, or may be information generated by another information processing system.

That is, specifically, for example, the learning character string acquisition unit 115 may acquire learning character string information related to a learning character string in which a feature and a label are set in at least one character string from the information processing system 200 and store the learning character string information in the storage unit 110.

Furthermore, the learning character string acquisition unit 115 may acquire, for example, learning character string information related to a learning character string in which features are not set from the information processing system 200. In this case, the natural language processing system 100 (e.g., feature extraction unit 140 to be described later) may extract a feature of a learning character string on the basis of learning character string information acquired by the learning character string acquisition unit 115, and generate learning character string information in which a feature and a label are set in at least one character string. Then, the learning character string acquisition unit 115 may acquire learning character string information in which a feature and a label are set in at least one character string, and store the learning character string information in the storage unit 110.

Here, a feature includes, for example, a character type or a morpheme.

A character type is information indicating the type of character string, and includes, for example, kanji characters, katakana characters, hiragana characters, romaji characters, numbers, and others.

A morpheme is, for example, information indicating a part of speech of a character string, and includes, for example, information indicating a noun, a verb, a prefix, a suffix, a common noun, a proper noun, a general noun, and a personal name.

Furthermore, a morpheme may include information indicating the position of the corresponding character string in the word to which the corresponding character string belongs. That is, in a case where the character string is the first character of the word, information indicating the first character (e.g., "B") may be included, and in a case where the character string is a character that is not the first character of the word, information indicating that the character string is not the first character (e.g., "I") may be included.

A label is information indicating an attribute corresponding to a meaning indicated by the character string in, for example, a word, a clause, a sentence, or the like to which the character string belongs, and includes, for example, "unique name", "place name", "organization", "personal name", "date", and "address". That is, a label indicates, for example, an attribute corresponding to the meaning of the character string given on the basis of the character type, the morpheme, the position of the character string in the sentence or the word, and the like.

Specifically, in a case where there is a numerical character string, the numerical character string may indicate a date or an address in a word, a clause, a sentence, or the like to which the numerical character string belongs. Since a label is information related to the semantic content of the character string, it is possible to determine what meaning the character string has (e.g., whether it is number indicating date) on the basis of the label.

In a case where a label indicates a date, the label may indicate, for example, a specific date and time, and may indicate a specific time (e.g., beginning, middle, and end of month, season, and the like). In addition, in a case where a label indicates an address, the label may indicate an address of a specific point or may indicate a specific region.

A label of a numerical character string may indicate a meaning represented by the number. Specifically, in a case where the number is related to the stock market, the label may indicate, for example, any number (e.g., high price, closing price, what kind of index, stock price, rate of change, point, or the like) in any market (e.g., domestic market, prime market, or the like) at any time (e.g., beginning of month, end of month, or the like). That is, in a case where the number is the price of Index A at the beginning of the month in January, the label for the number may be "the price of Index A at the beginning of the month in January".

A label may be expressed using a predetermined symbol for each type of label. A label indicating "unique name" may be expressed as, for example, "ART", and a label indicating "date" may be expressed as, for example, "DAT". Furthermore, in a case where the content does not correspond to an appropriate label, it may be expressed as "O" indicating that it is another label.

In a learning character string, features and labels only need to be set in at least one character string, and features and labels need not be set in all the character strings.

Furthermore, in a learning character string, a label may be set for each character string (i.e., one character or character string of two or more characters) or may be set for each word.

Furthermore, the learning character string acquisition unit 115 may acquire and store the learning character string information itself in the storage unit 110, or may acquire information related to a link of learning character string information and store information related to a link of the learning character string information in the storage unit 110.

FIG. 2 is a diagram illustrating an example of learning character string information stored in the storage unit 110. Information stored in the storage unit 110 includes, for example, a learning character string ID, learning character string content information, feature information, and label information.

A learning character string ID is information for identifying a learning character string included in learning character string information.

Learning character string content information is information related to the content of a learning character string. In the learning character string content information, a label is set in at least one character string ("4" and "month") included in the learning character string.

Feature information is information indicating features corresponding to a character string. The feature information includes, for example, information indicating a character type and information indicating a morpheme. Label information is information indicating a label corresponding to a character string.

Note that the description format of feature information and label information illustrated in FIG. 2 is an example, and the description format of feature information and label information is not limited thereto. In FIG. 2, feature information and label information may be set for each character, each character string of two or more characters, or each word.

The learning unit 120 learns the relationship between a feature of a character string and a label corresponding to the character string on the basis of the learning character string in which the feature and the label are set, generates a weight array and a learned model, and stores the weight array and the learned model in the storage unit 110.

For example, the learning unit 120 learns a relationship between a label of a predetermined character string and a feature of a character string at a predetermined relative position (e.g., two words before and after) from the predetermined character string. Note that the character string at the predetermined relative position may include the predetermined character string.

A weight array is array data related to a weight serving as a reference for determining a label of a character string, and is array data in which a feature of at least one character string of a learning character string and a weight for each relative position of the feature are associated with each other.

A learned model learned by the learning unit 120 is a model that determines a label corresponding to a character string on the basis of a feature and a weight array. Here, a feature includes, for example, a feature corresponding to a character string located at a predetermined relative position (e.g., two words before and after) from a character string to be subjected to label determination.

Specifically, a learned model outputs a score related to a label of a specific character string to be determined on the basis of a feature (e.g., feature corresponding to character string located at predetermined relative position from specific character string) and a weight array that are input.

The learning unit 120 generates a weight array in response to an instruction from the system administrator, for example. In addition, learning may be automatically executed at a predetermined timing such as a system maintenance time, or may be executed immediately before label determination processing by the label determination unit 145 described later. The learning algorithm is not particularly limited, but a conditional random field can be used, for example.

The weight array acquisition unit 125 acquires a weight array generated by learning by the learning unit 120. That is, the weight array acquisition unit 125 acquires a weight array related to a weight for determining a label corresponding to a character string generated by learning based on at least one learning character string in which a feature and a label of at least one character string are set in at least one character string including at least one character.

Furthermore, the weight array acquisition unit 125 may acquire a weight array stored in an external information processing system from the external information processing system and store the weight array in the storage unit 110. As a result, the natural language processing system 100 can utilize the result learned in the external information processing system for the label determination processing.

FIG. 3 is a diagram illustrating an example of a weight array stored in the storage unit 110. A weight array stored in the storage unit 110 includes, for example, feature information, relative position information, and weight information.

Relative position information is information related to a relative position of each feature corresponding to feature information. Here, a relative position is, for example, a relative position starting from a target character string to be subjected to label determination by the label determination unit 145 described later.

Weight information is information related to a weight corresponding to a feature and a relative position and serving as a reference for determining a label of a character string.

Note that the storage unit 110 may store a weight array and a learned model generated by the learning unit 120, or may store information corresponding to a weight array stored in an external information processing system or information related to a link of information corresponding to the weight array.

The target character string acquisition unit 130 acquires target character string information related to a target character string to be subjected to the label determination processing on the basis of document data or image data including data related to a character string provided to the natural language processing system 100, and stores the target character string information in the storage unit 110.

The target character string acquisition unit 130 may receive document data or image data including data related to a character string from the user terminal 300, or may acquire the document data or image data from an external information processing system on the basis of an instruction from the user through the user terminal 300.

In a case where the natural language processing system 100 receives provision of document data including data related to a character string, the target character string acquisition unit 130 analyzes the document data, for example, and acquires a character string included in the received document data.

In a case where the natural language processing system 100 receives provision of image data including data related to a character string, the target character string acquisition unit 130 acquires a character string included in the received image data using, for example, an image recognition technology.

FIG. 4 is a diagram illustrating an example of target character string information stored in the storage unit 110. Target character string information stored in the storage unit 110 includes, for example, a target character string ID, a group ID, and target character string content information.

A target character string ID is information for identifying a target character string to be subjected to label determination processing in the natural language processing system 100. A target character string ID may be set, for example, for each character or word.

A group ID is information for identifying a group to which a character string corresponding to a target character string ID belongs. A group may be, for example, a word, a clause, a sentence, a paragraph, or the like to which a character string belongs.

Target character string content information is information related to the content of a target character string.

Note that in the diagram illustrated in FIG. 4, the target character string ID is set for each word, but may be set for each character.

The modification information acquisition unit 135 acquires modification information related to modification of a plurality of clauses corresponding to the target character string and stores the modification information in the storage unit 110. Here, the plurality of clauses corresponding to the target character string is, for example, a plurality of clauses included in a sentence to which the target character string belongs.

Modification indicates, for example, a relationship between a plurality of clauses included in one sentence. That is, modification indicates, for example, a relationship between a subject and a predicate and a relationship between a subject and a modifier. For example, in a clause having a relationship between a subject and a modifier, since the clause corresponding to the modifier modifies the clause corresponding to the subject, it can be said that the clause corresponding to the modifier is a modification source clause and the clause corresponding to the subject is a modification destination clause.

For example, for each clause, the modification information acquisition unit 135 acquires modification information indicating the modification destination and modification source clauses of the clause in question.

Furthermore, for example, the modification information acquisition unit 135 can acquire, for each clause, modification information indicating the modification source clause of the modification destination source of the clause in question.

For example, the modification information acquisition unit 135 can acquire modification information by performing known natural language processing analysis on a character string (e.g., sentence, paragraph, or the like) to which the target character string belongs. Alternatively, for example, the modification information acquisition unit 135 may acquire modification information of a character string to which the target character string belongs from an information processing system capable of generating modification information.

FIG. 5 is a diagram illustrating an example of a modification relationship in a character string. FIG. 5 illustrates an example of a modification relationship in a sentence "Kabu-shikishijowa, gesshowa gerakushite hajimarimashita (The stock market started off falling early in the month).".

For example, since the clause "Kabushikishijowa" of clause number 1 modifies the clause "hajimarimashita" of clause number 4, the clause number of the modification destination clause of the clause of clause number 1 is "4". Similarly, the clause number of the modification source clause of the clause of clause number 4 is "1, 2, 3". In addition, the clause number of the modification source clause of the modification destination clause (In this case, clause number 4) of clause number 1 is "1, 2, 3".

The feature extraction unit 140 extracts a feature corresponding to the target character string, and generates feature information.

The feature extraction unit 140 extracts, for example, a character type and a morpheme corresponding to the target character string as the feature.

In addition, the feature extraction unit 140 may extract, for example, features of two words before and after a character string or features of two characters before and after a character string as features corresponding to the target character string, or can extract other features in an arbitrary range. Here, the range in which the feature extraction unit 140 extracts features may be based on a setting by the system administrator of the natural language processing system 100 or may be based on a setting by the user.

In addition, the feature extraction unit 140 can extract, as a feature corresponding to a target character string, a feature corresponding to a modification source clause of a clause corresponding to the target character string on the basis of modification information. Furthermore, the feature extraction unit 140 can extract, as a feature corresponding to the target character string, a feature corresponding to a clause that is different from the clause corresponding to the target character string and is a modification source clause of a modification destination clause of the clause corresponding to the target character string, on the basis of the modification information.

Here, the meaning of the feature extraction unit 140 extracting a feature on the basis of modification information and the label determination unit 145 described later performing label determination processing on the basis of a feature extracted on the basis of the modification information will be described using a specific example.

Specifically, label determination processing of a target character string "gerakushi" in a sentence "lgatsuno kabushikishijowa joshoshimashitaga, gesshowa, enda-kanoshinkonadowo ukete gerakushimashita. (Although the stock market ramped up in January, it declined at the beginning of the month with the appreciation of the yen)" will be considered as an example. In this case, the label of the target character string "gerakushi" is appropriately set to, for example, "the situation of the stock market at the beginning of the month in January". Grammatically, "gesshowa" modifies "gerakushi", so this sentence indicates that the stock market fell at the beginning of the month.

In a case where the feature extraction unit 140 extracts features of words before and after the target character string or features of two characters before and after the character string, and the label determination unit 145 to be described later performs label determination processing on the basis of the extracted features, a problem is assumed in which features of a character string located at a position away from the target character string cannot be taken into account in the label determination processing.

In other words, in a case where the label determination processing is performed on the basis of features of words before and after the target character string, for example, a feature of a character string at a position close to the target character string such as "shinko" or "ukete" can be used for the label determination processing, but "gesshowa" which is important in the label determination processing of "gerakushi" is at a position away from the target character string and cannot be used as a feature. Therefore, in the label determination processing of "gerakushi" in the above sentence, it is not possible to consider the fall at the beginning of the month, and a problem that appropriate label determination processing cannot be performed is assumed.

Therefore, the feature extraction unit 140 extracts, as a feature corresponding to the target character string, a feature corresponding to the modification source clause "gesshowa" of the clause corresponding to the target character string on the basis of modification information. As a result, the label determination unit 145 to be described later can take into account a feature of a character string (in this case, "gessho") at a position away from the target character string in the label determination processing, and can improve accuracy of the label determination processing.

Next, label determination processing of the target character string "gerakushite" in the sentence "lgatsuno kabu-shikishijowa joshoshimashitaga, gesshowa, enda-kanoshinkonadowo ukete, gerakushite hajimarimashita." will be considered as an example. In this case, "gesshowa" modifies "hajimari" and does not modify "gerakushite". Therefore, even if the feature extraction unit 140 extracts a feature corresponding to a modification source clause of a clause corresponding to the target character string as a feature corresponding to the target character string on the basis of the modification information, the feature corresponding to "gesshowa" cannot be considered in the label determination processing of "gerakushite".

On the other hand, since "gerakushite" modifies "haji-mari", "hajimari" is the modification destination of "gess-howa" and "gerakushite". Therefore, the feature extraction unit 140 can extract, as a feature corresponding to the target character string, a feature corresponding to a clause (in this case, "gesshowa") that is different from the clause corresponding to the target character string and is a modification source clause of a modification destination clause (in this case, "hajimari") of the clause corresponding to the target character string, on the basis of the modification information. As a result, the label determination unit 145 to be described later can take into account a feature of a character string at a position away from the target character string in the label determination processing, and can improve accuracy of the label determination processing.

Note that when extracting a feature on the basis of modification information, in a case where the target character string is a morpheme that is a predetermined character string (e.g., main term of clause) of a clause to which the target character string belongs, the feature extraction unit 140 can extract, as a feature corresponding to the target character string, a feature corresponding to a modification source clause of a clause corresponding to the target character string, or a feature corresponding to a clause that is different from the clause corresponding to the target character string and is a modification source clause of a modification destination clause of the clause corresponding to the target character string.

Specifically, for example, in the clause "gerakushite", the morpheme that is the main term is "geraku", and the morpheme that is not the main term is "shi" and "te". In this case, in the sentence to which the clause "gerakushite" belongs, "geraku" often determines the meaning of the sentence or other words, but "shi" and "te" are additional character strings used grammatically, and may have little influence on the meaning of the sentence.

In this case, the feature extraction unit 140 can extract, as a feature corresponding to the target character string "ger-aku", a feature corresponding to a modification source clause of the clause "gerakushite" to which the target character string "geraku" belongs, or a feature correspond-ing to a clause that is different from the clause "gerakushite" corresponding to the target character string and is a modi-fication source clause of the modification destination clause. On the other hand, the feature extraction unit 140 can omit extracting, as a feature corresponding to the target character string "shi" or "te", a feature corresponding to a modifica-tion source clause of the clause "gerakushite" to which the target character string "shi" and "te" belongs, and a feature corresponding to a clause that is different from the clause "gerakushite" corresponding to the target character string and is a modification source clause of the modification destination clause.

As a result, the natural language processing system 100 can more appropriately grasp the modification relationship and extract a highly relevant feature that is considered to affect label determination processing of the target character string to be described later. In addition, this makes it possible to eliminate features that are considered not to affect the label determination processing, reduce the amount of feature data used for the label determination processing, and improve the speed and accuracy of the label determination processing.

Note that when extracting a feature corresponding to a clause, the feature extraction unit 140 can extract a feature corresponding to a character string (e.g., character string of one character, character string of two or more characters, word, or the like) included in the clause, for example.

The label determination unit 145 determines a label of the target character string on the basis of the learned model, the weight array, and at least one feature information corre-sponding to the target character string extracted and gener-ated by the feature extraction unit 140, and stores determi-nation result information in which the target character string and the label are associated with each other in the storage unit 110.

Here, the target character string is, for example, a char-acter string (e.g., character string of one character, character string of two or more characters, word, or the like) to be subjected to label determination processing by the label determination unit 145.

The label determination unit 145 inputs at least one feature information corresponding to the weight array and the target character string to the learned model, and calculates a score of at least one label candidate corresponding to the target character string. Thereafter, the label determination unit 145 can determine that a label (e.g., label with highest score) whose score is a certain value or more is a label corresponding to the target character string.

FIG. 6 is a diagram illustrating an example of label determination processing by the label determination unit 145. FIG. 6 illustrates an example when the label determination unit 145 determines a label for a target character string "gatsu (month)".

First, the feature extraction unit 140 extracts a feature corresponding to a character string (in this case, "wa (is)", "4", "gatsu (month)", "16", and "nichi (day)") at a predetermined relative position (e.g., two words before and after) from the target character string "gatsu". Then, the label determination unit 145 determines a label of the target character string "gatsu" on the basis of the learned model, the weight array, and the extracted feature.

In addition, the label determination unit 145 can determine a label of the target character string further on the basis of modification information.

That is, in this case, first, the feature extraction unit 140 extracts, for example, a feature corresponding to a modification source clause of a clause corresponding to the target character string or a feature corresponding to a clause that is different from the clause corresponding to the target character string and is a modification source clause of a modification destination clause of the clause corresponding to the target character string, on the basis of modification information. Then, the label determination unit 145 determines a label of the target character string on the basis of the learned model, the weight array, and the extracted feature.

FIG. 7 is a diagram illustrating an example of determination result information stored in the storage unit 110. Determination result information stored in the storage unit 110 includes, for example, a determination result ID, a target character string ID, and determination label information. A determination result ID is information for identifying determination result information. Determination label information is information indicating a label determined by the label determination unit 145.

The output unit 150 outputs the determination result information.

The output unit 150 may output the determination result information to the user terminal 300, for example. In this case, the output unit 150 may output to the user terminal 300 according to a display mode (e.g., color) according to the type of label.

Furthermore, the output unit 150 may output to another information processing system (e.g., information processing system that performs natural language processing subsequent to label determination processing).

FIG. 8 is a diagram illustrating an experimental result related to label determination accuracy in the natural language processing system 100. FIG. 8 illustrates the number of teacher data items used for the processing and the accuracy of the label determination in the processing of determining the label of the target character string included in a given character string using methods of Pattern 1 and Pattern 2 among processing methods in the natural language processing system 100.

Here, Pattern 1 indicates a result of a case where the label determination unit 145 performs the label determination processing on the target character string on the basis of the learned model, the weight array, the feature corresponding to the target character string, and the feature corresponding to the modification source clause of the clause corresponding to the target character string. Meanwhile, Pattern 2 indicates a result of a case where the label determination unit 145 performs the label determination processing on the target character string further on the basis of a feature corresponding to a clause that is different from the clause corresponding to the target character string and is a modification source clause of a modification destination clause of the clause corresponding to the target character string.

As illustrated in FIG. 8, in a case where the label determination unit 145 performs the label determination processing on the target character string further on the basis of a feature corresponding to a clause that is different from the clause corresponding to the target character string and is a modification source clause of a modification destination clause of the clause corresponding to the target character string, it can be seen that the accuracy of the label determination is improved without increasing the number of teacher data items.

Figure 9:
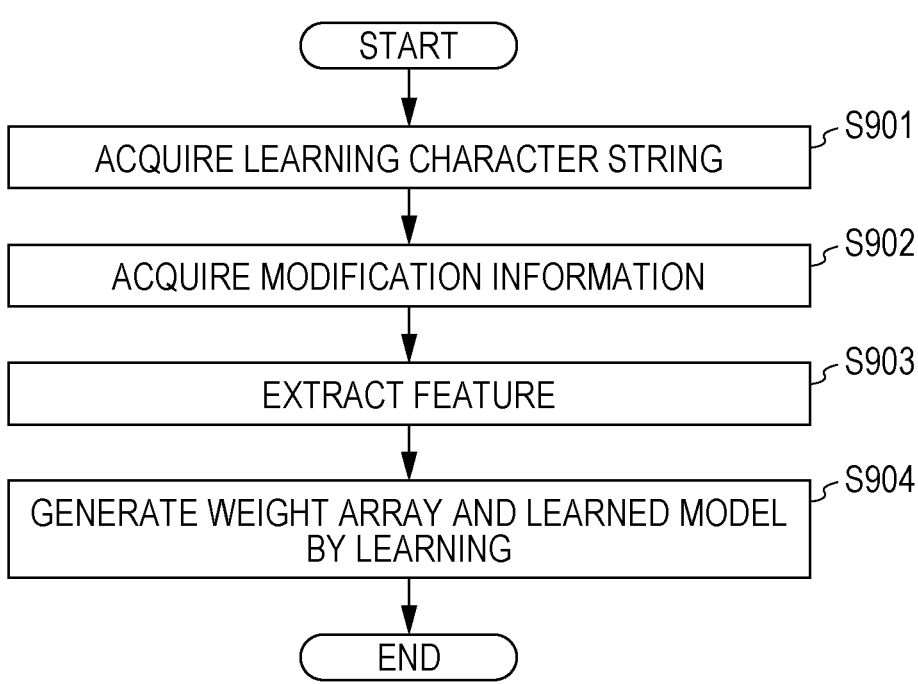
FIG. 9 is a flowchart illustrating an example of processing in the natural language processing system.

FIG. 9 is a flowchart illustrating an example of processing in the natural language processing system 100. FIG. 9 is a flowchart illustrating an example of learning processing in the natural language processing system 100.

First, the learning character string acquisition unit 115 acquires learning character string information (S901). Subsequently, the modification information acquisition unit 135 acquires modification information corresponding to a target character string (S902). The feature extraction unit 140 extracts a feature corresponding to the target character string (S903). Then, the learning unit 120 learns on the basis of the learning character string information and generates a weight array and a learned model (S904).

Note that the learning character string acquisition unit 115 may acquire a learning character string in which a feature and a label are set in at least one character string. In this case, the modification information acquisition processing by the modification information acquisition unit 135 or the feature extraction processing by the feature extraction unit 140 may be omitted as appropriate.

Figure 10:
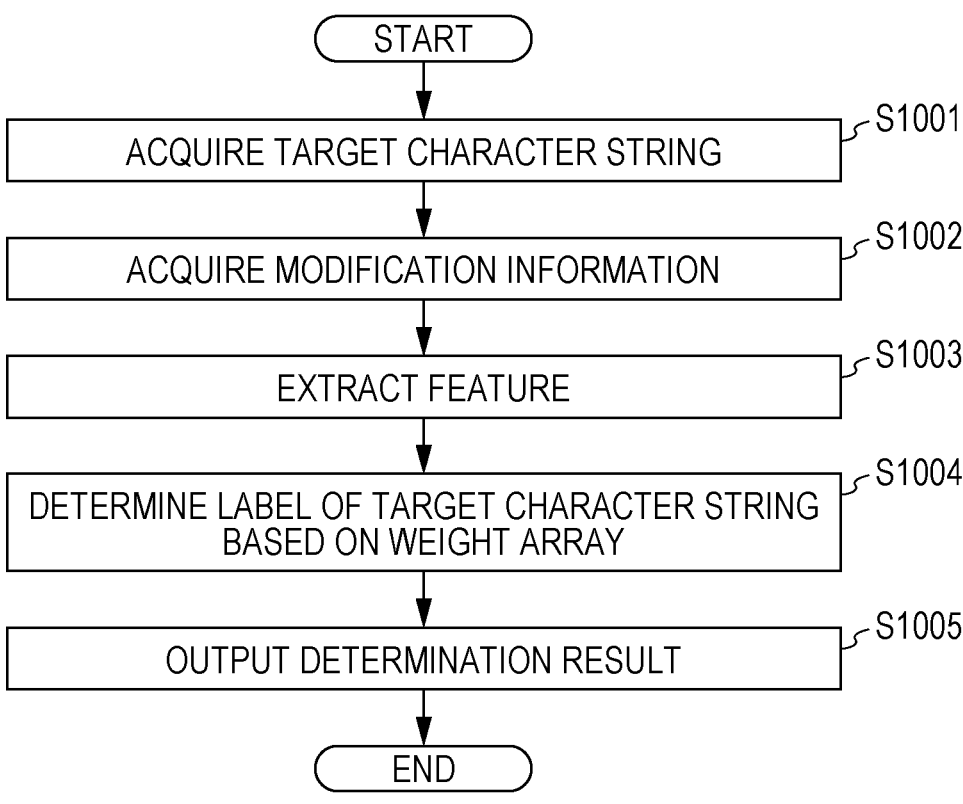
FIG. 10 is a flowchart illustrating an example of processing in the natural language processing system.

FIG. 10 is a flowchart illustrating an example of processing in the natural language processing system 100. FIG. 10 is a flowchart illustrating an example of label determination processing on a target character string in the natural language processing system 100.

First, the target character string acquisition unit 130 acquires a target character string to be subjected to the label determination processing on the basis of an instruction from the user through the user terminal 300 (S1001). Subsequently, the modification information acquisition unit 135 acquires modification information corresponding to the target character string (S1002).

Then, the feature extraction unit 140 extracts a feature corresponding to the target character string (S1003). At this time, the feature extraction unit 140 may extract a feature corresponding to a modification source clause of a clause corresponding to the target character string, and a feature corresponding to a clause that is different from the clause corresponding to the target character string and is a modification source clause of a modification destination clause of the clause corresponding to the target character string. The label determination unit 145 determines the label of the target character string on the basis of the learned model, the weight array, and the extracted feature (S1004). The output unit 150 outputs determination result information on the basis of the determination result (S1005).

The embodiment of the present invention has been described above. The natural language processing system 100 can determine a label of a target character string on the basis of a learned model and a weight array generated by learning based on at least one learning character string in which a feature and a label are set, and a feature corresponding to the target character string. As a result, even in documents with different layouts, it is possible to determine a label of a target character string and analyze documents with different layouts.

Furthermore, on the basis of modification information, the natural language processing system 100 can extract a feature corresponding to at least one of a modification source clause of a target clause corresponding to a target character string and a clause that is a modification source clause of the modification destination clause of the target clause and is different from the target clause, and perform the label determination processing. As a result, the modification of the target character string can be used as a feature in the label determination processing, and the feature of a character string in a wider range can be used in the label determination processing.

Note that the present embodiment is for facilitating understanding of the present invention and is not intended to limit the present invention. The present invention can be modified and improved without departing from the gist of the invention, and equivalents thereof are also included in the present invention.

What is claimed is:

1. A natural language processing system comprising a processor configured to:

generate, by machine learning, a weight array and a learned model based on at least one learning character string in which a feature and a label of at least one character string including at least one character are set;

acquire a target character string;

acquire the weight array related to a weight for determining the label corresponding to the target character string;

acquire modification information related to modification of a plurality of clauses corresponding to the target character string;

extract a feature corresponding to at least one of a modification source clause of a target clause corresponding to the target character string and a clause that is different from the target clause and is a modification source clause of a modification destination clause of the target clause, on the basis of the modification information; and determine the label of the target character string on the basis of the learned model generated by the machine learning, the weight array, and the extracted feature.

2. The natural language processing system according to claim 1, wherein the label indicates an attribute corresponding to a meaning of the target character string in a character string to which the target character string belongs.

3. A computer-implemented method for natural language processing, method comprising:

generating, by machine learning, a weight array and a learned model based on at least one learning character string in which a feature and a label of at least one character string including at least one character are set;

acquiring a target character string;

acquiring the weight array related to a weight for determining the label corresponding to the target character string;

acquiring modification information related to modification of a plurality of clauses corresponding to the target character string;

extracting a feature corresponding to at least one of a modification source clause of a target clause corresponding to the target character string and a clause that is different from the target clause and is a modification source clause of a modification destination clause of the target clause, on the basis of the modification information; and determining the label of the target character string on the basis of the learned model generated by the machine learning, the weight array, and the extracted feature.

4. A non-transitory computer-readable medium storing a natural language processing program for causing a computer to implement:

generating, by machine learning, a weight array and a learned model based on at least one learning character string in which a feature and a label of at least one character string including at least one character are set;

acquiring a target character string;

acquiring the weight array related to a weight for determining the label corresponding to the target character string;

acquiring modification information related to modification of a plurality of clauses corresponding to the target character string;

extracting a feature corresponding to at least one of a modification source clause of a target clause corresponding to the target character string and a clause that is different from the target clause and is a modification source clause of a modification destination clause of the target clause, on the basis of the modification information; and determining the label of the target character string on the basis of the learned model generated by the machine learning, the weight array, and the extracted feature.

* * * * *